March 31, 1936.                O. F. GOLTSCH                2,036,133
                          AUTOMATIC TRANSMISSION
                          Filed April 15, 1935        3 Sheets-Sheet 1

INVENTOR
O. F. Goltsch
BY
ATTORNEY

March 31, 1936.   O. F. GOLTSCH   2,036,133
AUTOMATIC TRANSMISSION
Filed April 15, 1935   3 Sheets-Sheet 3

INVENTOR
O. F. Goltsch
BY
ATTORNEY

Patented Mar. 31, 1936

2,036,133

UNITED STATES PATENT OFFICE 2,036,133

AUTOMATIC TRANSMISSION

Otto F. Goltsch, Dos Palos, Calif.

Application April 15, 1935, Serial No. 16,219

3 Claims. (Cl. 74—114)

This invention relates to automatic transmissions for motor vehicles, my principal object being to provide a structure of this character in which the initial driving connection between the engine and propeller shafts is obtained automatically without the use of a manually operated clutch when the speed of the engine exceeds a predetermined minimum; one in which a subsequent increase in engine speed correspondingly increases the speed of the propeller shaft without the use of gears and without the operator having to manipulate any levers or the like; and one in which the engine shaft is driven by the propeller shaft when the speed of the latter exceeds that of the engine shaft, so that the engine may be used as a brake, as has been determined to be most advantageous.

A further object is to construct and arrange the parts of the transmission so that when the engine and propeller shafts are both turning at the same speed, all relative movement of the operating parts of the transmission ceases and the entire structure turns as a unit. Friction and wear on such parts is therefore reduced to a minimum.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
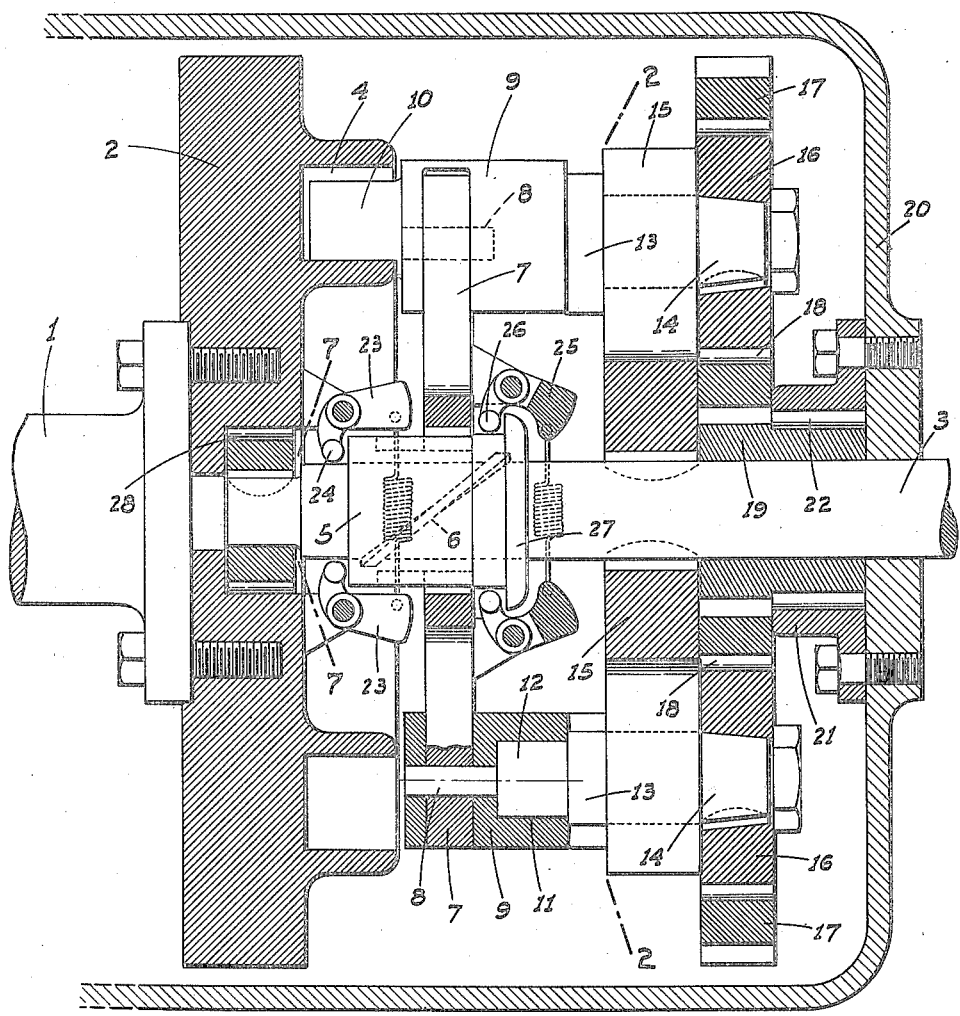
Figure 1 is a sectional elevation of the transmission with the parts in their normal non-operation positions, or when the engine shaft is idling.
Figure 7:
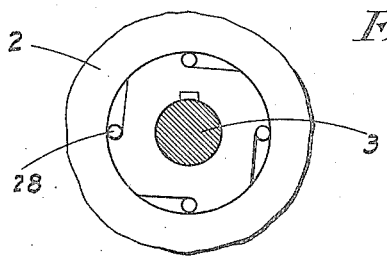
Figure 7 is a fragmentary transverse section on the line 7—7 of Figure 1 showing the overrunning clutch connection between the propeller shaft and fly-wheel.

Referring now more particularly to the characters of reference on the drawings, the numeral 1 denotes the engine shaft which is rigidly fixed to a fly-wheel 2. The numeral 3 denotes the propeller shaft which is longitudinally alined with but separate from and turnable relative to the engine shaft. Formed on the rear face of the fly-wheel is an oval cam groove 4 disposed symmetrical to the axis of the wheel and shaft.

A sleeve 5 is splined on the shaft 3 adjacent but rearwardly of the fly-wheel, said sleeve being arranged for sliding spiral movement on the shaft by means of a spirally disposed key 6 or the like. Splined on the sleeve for direct relative longitudinal movement is a spider comprising four radial arms 7 disposed 90° apart. Pivoted at one end on the outer ends of the arms as by pins 8 are links 9, extending circumferentially relative to the fly-wheel. Pins 10 project forwardly from the outer ends of the links and engage the cam groove 4, all the links extending in the same direction from their pivoted ends. Grooves 11 are formed in the rear faces of the links rearwardly of the arms 7, said grooves having rounded ends disposed in axial alinement with the pins 8 and 10.

Engaging these grooves are the crank pins 12 of cranks 13, which are secured on shafts 14 journaled in a spider 15 keyed on the shaft 3 and disposed rearwardly of the cranks and spider 7. Fixed on these shafts rearwardly of the spider 15 are discs 16 turnable on which are ring gears 17; there being overrunning or one-way clutch devices indicated conventionally at 18 between the discs and corresponding gears.

The gears engage a pinion 19 concentric with but turnable relative to the shaft 3, and disposed between the spider 15 and the rear wall of the transmission housing 20. This pinion also turns in a boss 21 fixed on the housing; there being a one-way brake device as at 22 between the boss and the hub of the pinion to prevent rotation of the latter in one direction.

Figure 2:
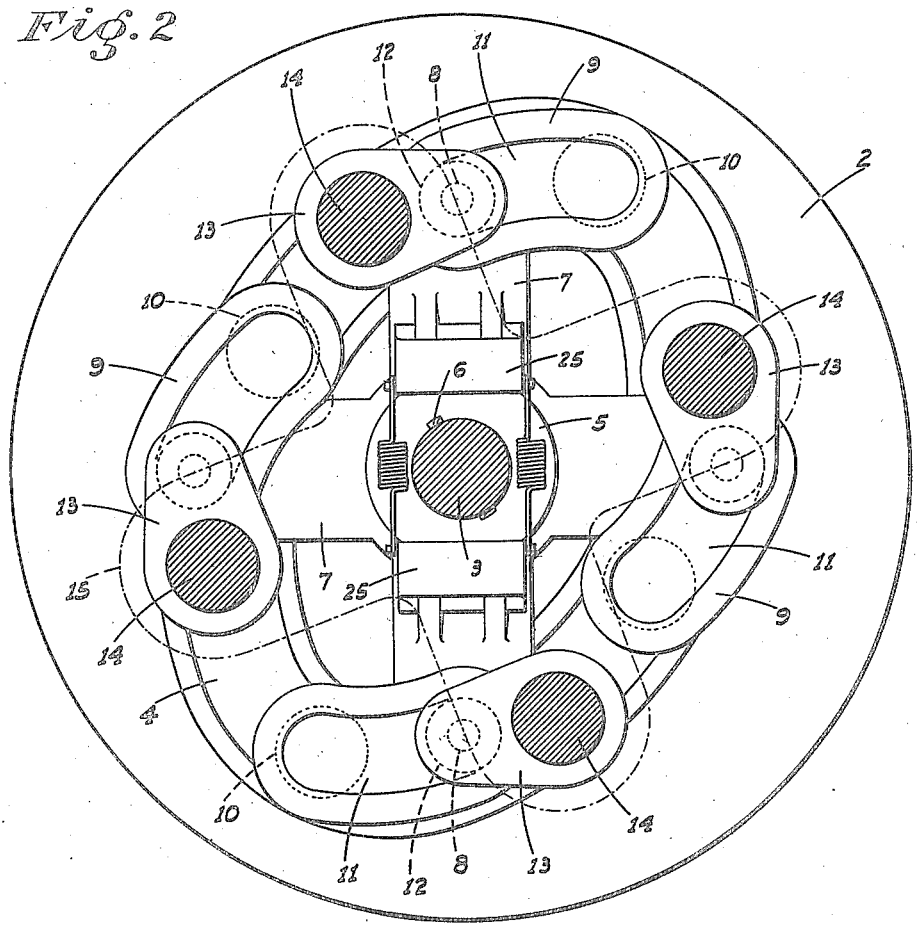
Figure 2 is a transverse section on the line 2—2 of Figure 1.
Figure 3:
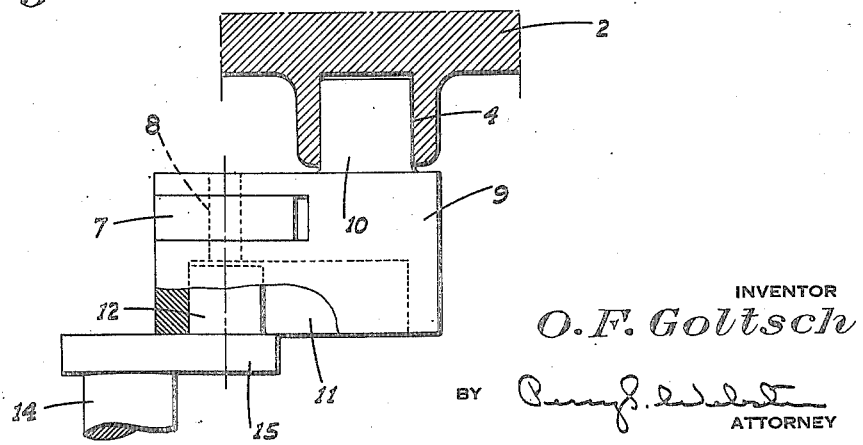
Figure 3 is a fragmentary plan showing the relative position of the crank and cam pins when the parts are in the position shown in Figures 1 and 2.

From the above description of parts it will be seen that with the rotation of the fly-wheel relative to the shaft 3 and the spider 7, the links 9 will oscillate through an arc determined by the difference between the major and minor axes of the cam groove 4. If the crank pins 12 in the link grooves are at that end of said grooves which places them in alinement with the pivots 8 of the links, as shown in Figures 1, 2 and 3, such oscillation will have no effect on the cranks 13.

The crank shaft 14 will then remain stationary so that no movement will be imparted to the gears nor to the pinion 19 or the spider 15 to rotate the shaft 3.

Figure 4:
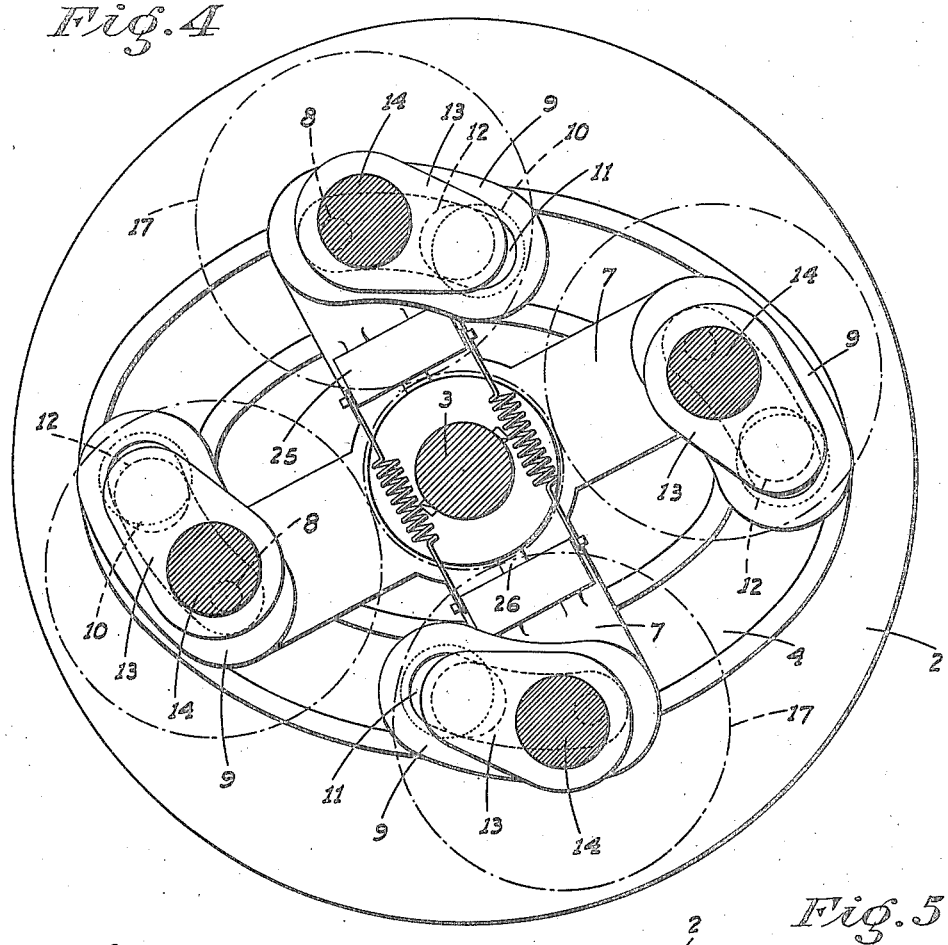
Figure 4 is a transverse section of the transmission with the parts in the position occupied when the engine shaft is speeded up and the propeller shaft is being driven.
Figure 6:
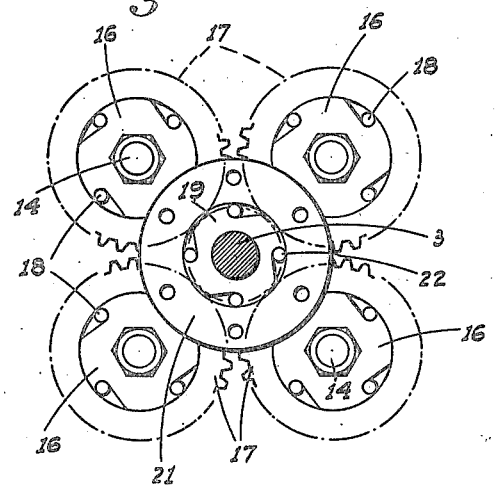
Figure 6 is a diagrammatic end view of the planetary gear unit.
Figure 5:
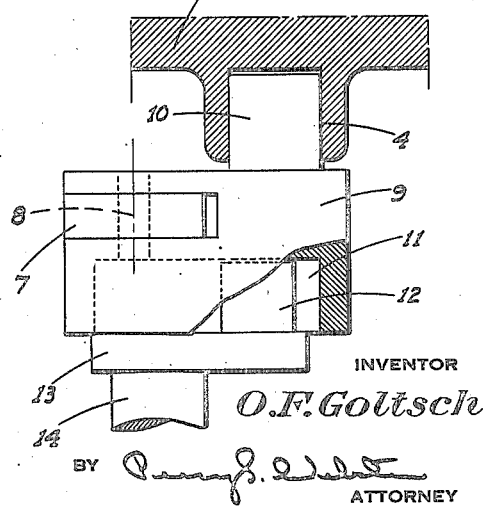
Figure 5 is a fragmentary plan showing the relative position of the crank and cam pins when the parts are in the position of Figure 4.

This is the position of the parts when the engine is running at a low idling speed. If however the spider 7 is rotated about the shaft 3 in a direction opposite to the outer ends of the links, so as to relatively shift the crank pins toward the outer end of the link grooves, as shown in Figures 4 and 5, the cranks will be oscillated as the links oscillate, and with a stroke whose length is in direct proportion to the distance of the crank pins from the link pivots.

With the oscillation of the cranks the gears 17 will be rotated with the oscillating movement of the cranks in one direction only, due to the overrunning clutch connections 18 between the gears and discs 16 which are fixed on the crank shafts 14. Since the pinion 19 is held against rotation in the direction in which it would otherwise be rotated by the rotation of the gears, said gears must planetate around the pinion. This of course causes the spider 15 and consequently the shaft 3 to be likewise rotated. Owing to the fact that four link and crank units are used, two of the gears will always be driven while the other two are backing up or idling, thus giving a continuous shaft driving torque and avoiding a jerky or intermittent motion. As the shaft 3 rotates the spider 7 of course rotates also until, as the speed of the shaft 3 and the spider equal that of the drive shaft and fly-wheel, it turns as a unit with the fly-wheel and no oscillating movement is imparted to the links or cranks. Any slight reduction in speed of the propeller shaft relative to the fly-wheel however again sets up the oscillating movement of the cranks and the driving of the gears and of the propeller shaft will be renewed.

The spider 7 is thus shifted as the engine speeds up above its normal idling speed by a spring controlled centrifugal governor device 23 mounted on the fly-wheel. This device is connected to elements 24 positioned to engage and push the sleeve 5 rearwardly. Since the sleeve is spirally keyed on the shaft 3, it will rotate on said shaft with such rearward movement, turning the spider 7 which is splined on the sleeve. The faster the fly-wheel rotates the greater will be the movement of the governor and consequently the spider 7 will be turned to a greater extent. The crank pins then assume positions toward the outer end of the links, giving the greatest crank shaft stroke and driving effect, as previously pointed out and corresponding to a low gear setting of the ordinary transmission.

As the speed of the spider 7 increases the work of the governor 23 is supplemented or relieved by another similar governor unit 25 mounted on said spider. This unit is connected to elements 26 which engage behind an enlarged flange 27 on the sleeve 5 at its rear end, and act to further push or hold said sleeve in its rearward or turned position.

In order to prevent a free wheeling action between the shaft 3 and the fly-wheel or engine shaft when the speed of said shaft 3 exceeds the speed of the engine shaft, and which has been found to be undesirable from the experience of the past few years, the forward end of the shaft 3 is extended into the fly-wheel. An overrunning clutch unit 28 is interposed between said shaft and the fly-wheel in such a manner that the fly-wheel and consequently the engine shaft will be driven by the propeller shaft when the speed of the latter exceeds that of the fly-wheel.

The purpose of the overrunning clutch unit 22 between the pinion 19 and the fixed housing 20 is to eliminate at times the otherwise necessary action of the four sets of clutch units of the gears 17, thus reducing the wear on these parts to a considerable degree.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A transmission comprising separate axially alined drive and driven shafts, a fly-wheel on the drive shaft, a spider, means mounting the spider on the driven shaft for rotation therewith, links pivoted on the spider and extending in a plane transversely of the shaft, pins on the outer ends of the links projecting from one side thereof toward the fly-wheel, a cam-groove on the adjacent face of the fly-wheel into which the pins project, another spider fixed on the driven shaft beyond the first named spider, crank shafts pivoted in said other spider and disposed parallel to the driven shaft, connections between the crank shafts and the driven shaft and functioning with the rotation of the crank shafts in one direction to impart rotation to the driven shaft, crank pins projecting from said crank shafts, the other side of the links having longitudinal grooves into which the crank pins project, and means included in part with the mounting means of the first named spider to shift the same about the driven shaft whereby to shift the location of the crank pins along the grooves.

2. A transmission comprising separate axially alined drive and driven shafts, a fly-wheel on the drive shaft, a spider, means mounting the spider on the driven shaft for rotation therewith, links pivoted on the spider and extending in a plane transversely of the shaft, pins on the outer ends of the links projecting from one side thereof toward the fly-wheel, a cam-groove on the adjacent face of the fly-wheel into which the pins project, another spider fixed on the driven shaft beyond the first named spider, crank shafts pivoted in said other spider and disposed parallel to the driven shaft, connections between the crank shafts and the driving shaft and functioning with the rotation of the crank shafts in one direction to impart rotation to the driven shaft, crank pins projecting from said crank shafts, the other side of the links having longitudinal grooves into which the crank pins project, the grooves extending from the plane of the pivotal connections of the links with the spider and the crank pins occupying positions in axial alinement with said pivotal connections when the driven shaft is stationary, and means included in part with the mounting means of the first named spider and functioning with the rotation of the drive shaft at a speed above a predetermined minimum to shift the first named spider about the driven shaft so as to shift the links in a direction to relatively move the crank pins along the grooves and away from said axially alined position.

3. A structure as in claim 1, said last named means comprising a sleeve spirally splined on the driven shaft and on which said first named spider is mounted, a centrifugal governor mounted in connection with the drive shaft, and an element fixed with the governor and engaging the sleeve to slide the same along the driven shaft when said governor is actuated by an increase in speed of the drive shaft above a predetermined minimum.

OTTO F. GOLTSCH.